(12) United States Patent
Lee et al.

(10) Patent No.: US 10,827,514 B2
(45) Date of Patent: *Nov. 3, 2020

(54) METHOD AND APPARATUS FOR EFFICIENT UTILIZATION OF RESOURCES FOR INTERFERENCE CANCELLATION AND SUPPRESSION IN WIRELESS COMMUNICATION SYSTEMS

(71) Applicant: Samsung Electronics Co., Ltd., Gyeonggi-do (KR)

(72) Inventors: Hyojin Lee, Gyeonggi-do (KR); Cheolkyu Shin, Gyeonggi-do (KR); Yongjun Kwak, Gyeonggi-do (KR); Younsun Kim, Gyeonggi-do (KR); Juho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 35 days.

This patent is subject to a terminal disclaimer.

(21) Appl. No.: 16/111,957

(22) Filed: Aug. 24, 2018

(65) Prior Publication Data
US 2018/0368158 A1 Dec. 20, 2018

Related U.S. Application Data

(63) Continuation of application No. 14/703,234, filed on May 4, 2015, now Pat. No. 10,075,971.

(30) Foreign Application Priority Data

May 9, 2014 (KR) .................. 10-2014-0055378

(51) Int. Cl.
*H04W 72/12* (2009.01)
*H04L 25/06* (2006.01)
(Continued)

(52) U.S. Cl.
CPC ........ *H04W 72/1263* (2013.01); *H04B 15/00* (2013.01); *H04L 23/00* (2013.01);
(Continued)

(58) Field of Classification Search
CPC ............... H04W 16/10; H04W 72/042; H04W 28/0289; H04W 72/0446; H04L 5/001
See application file for complete search history.

(56) References Cited

U.S. PATENT DOCUMENTS

| 5,631,898 A | 5/1997 | Dent |
| 8,484,538 B2 | 7/2013 | Suzuki |

(Continued)

FOREIGN PATENT DOCUMENTS

| JP | 2003-110468 | 4/2003 |
| JP | 2009-290747 | 12/2009 |

(Continued)

OTHER PUBLICATIONS

Huawei, HiSilicon, "Discussion on Network Assistance Signalling for NAICS Receivers", R1-140060, 3GPP TSG RAN WG1 Meeting #76, Feb. 10-14, 2014, 6 pages.

(Continued)

*Primary Examiner* — Raj Jain
(74) *Attorney, Agent, or Firm* — The Farrell Law Firm, P.C.

(57) ABSTRACT

The present invention relates to a method and an apparatus for transmitting interference related control information in order to improve reception performance of a UE which receives a downlink signal, in a cellular mobile communication system based on an Long Term Evolution-Advanced (LTE-A) system. A communication method includes receiving, from a base station, resource allocation information on resource allocation granularity for a neighbor cell associated with an interference signal; identifying the resource alloca- (Continued)

tion granularity for the neighbor cell; and performing an interference cancellation for the interference signal based on the resource allocation granularity for the neighbor cell.

16 Claims, 12 Drawing Sheets

(51) Int. Cl.
   *H04W 72/04* (2009.01)
   *H04B 15/00* (2006.01)
   *H04W 72/08* (2009.01)
   *H04L 23/00* (2006.01)
   *H04L 1/00* (2006.01)

(52) U.S. Cl.
   CPC ......... *H04L 25/067* (2013.01); *H04W 72/082* (2013.01); *H04L 1/0048* (2013.01); *H04W 72/04* (2013.01)

(56) References Cited

U.S. PATENT DOCUMENTS

| | | | |
|---|---|---|---|
| 10,075,971 B2* | 9/2018 | Lee | H04B 15/00 |
| 2011/0255483 A1 | 10/2011 | Xu et al. | |
| 2014/0126404 A1 | 5/2014 | Kim | |
| 2015/0023317 A1 | 1/2015 | Yokomakura et al. | |
| 2015/0131758 A1* | 5/2015 | Chen | H04B 1/1027 375/340 |
| 2015/0282190 A1* | 10/2015 | Jung | H04B 17/345 370/330 |
| 2015/0326324 A1 | 11/2015 | Lee | |
| 2015/0358975 A1* | 12/2015 | Yang | H04W 72/082 370/336 |
| 2016/0021565 A1* | 1/2016 | Kim | H04J 11/004 370/329 |
| 2017/0078126 A1* | 3/2017 | Einhaus | H04W 72/042 |

FOREIGN PATENT DOCUMENTS

| | | |
|---|---|---|
| JP | 2013-530565 | 7/2013 |
| JP | 2013-197710 | 9/2013 |
| KR | 10-2014-0056899 | 5/2014 |

OTHER PUBLICATIONS

MediaTek Inc., "Discussion on the Feasibility of Network Assistance", R1-140248, 3GPP TSG-RAN WG1 #76, Feb. 10-14, 2014, 6 pages.
NSN, Nokia, "TP for Network Assistance in NAICS", R1-140577, Feb. 10-14, 2014, 2 pages.
Zte, "Network Assistance Signalling for NAICS", R1-140267, 3GPP TSG RAN WG1 Meeting #76, Feb. 10-14, 2014, 4 pages.
MediaTek Inc., "Higher-Layer Signalling for NAICS and System Impact Analysis", R1-141488, 3GPP TSG-RAN WG1 #76bis, Mar. 31-Apr. 4, 2014, 8 pages.
International Search Report dated Jul. 28, 2015 issued in counterpart application No. PCT/KR2015/004148, 3 pages.
European Search Report dated Jul. 23, 2015 issued in counterpart application No. 15163665.1-1860, 8 pages.
3GPP TSG-RAN WG4 Meeting #70bis, Mar. 31-Apr. 4, 2014, 10 pages.
Japanese Office Action dated Feb. 4, 2019 issued in counterpart application No. 2016-564330, 11 pages.
Japanese Office Action dated Oct. 21, 2019 issued in counterpart application No. 2016-564330, 7 pages.
Indian Office Action dated May 20, 2020 issued in counterpart application No. 201637037437, 6 pages.

* cited by examiner

METHOD AND APPARATUS FOR EFFICIENT UTILIZATION OF RESOURCES FOR INTERFERENCE CANCELLATION AND SUPPRESSION IN WIRELESS COMMUNICATION SYSTEMS

PRIORITY

This application is a Continuation Application of U.S. application Ser. No. 14/703,234, which was filed in the U.S. Patent & Trademark Office on May 4, 2015, and claims priority under 35 U.S.C. § 119(a) to Korean Patent Application No. 10-2014-0055378, which was filed in the Korean Intellectual Property Office on May 9, 2014, the entire disclosure of each of which is incorporated by reference herein.

BACKGROUND OF THE INVENTION

1. Field of the Invention

The present invention relates generally to a method and an apparatus for transmitting interference related control information in order to improve reception performance of a User Equipment (UE) which receives a downlink signal, in a cellular mobile communication system based on a Long Term. Evolution-Advanced (LTE-A) system.

2. Description of the Related Art

From the early stage of providing voice-oriented services, a mobile communication system has evolved into a high-speed and high-quality wireless packet data communication system to provide data and multimedia services. Various mobile communication standards such as High Speed Downlink Packet Access (HSDPA), High Speed Uplink Packet Access (HSUPA), Long Term Evolution (LTE), and Long Term Evolution-Advanced (LTE-A) of the $3^{rd}$ Generation Partnership Project (3GPP), High Rate Packet Data (HRPD) of the $3^{rd}$ Generation Partnership Project-2 (3GPP2), and IEEE 802.16 have recently been developed to support high-speed and high-quality wireless packet data communication services. In particular, the LTE system, which is a system developed to efficiently support high speed wireless packet data transmission, maximizes wireless system capacity by using various wireless access technologies. The LTE-A system, which is a wireless system obtained by advancing the LTE system, has an improved data transmission capacity compared to the LTE system.

In general, the LTE refers to an evolved Node B (eNB) and a UE apparatus corresponding to Release 8 or 9 of the 3GPP standard organization and the LTE-A refers to an eNB and a UE apparatus corresponding to Release 10 of the 3GPP standard organization. The 3GPP standard organization has standardized the LTE-A system and is now discussing the standard for a subsequent Release with improved performance, based on the standardized LTE-A system.

The existing $3^{rd}$ Generation (3G) and $4^{th}$ Generation (4G) wireless packet data communication systems such as HSDPA, HSUPA, HRPD, and LTE/LTE-A employ an Adaptive Modulation and Coding (AMC) scheme, a channel-sensitive scheduling scheme, and the like to improve transmission efficiency.

When the AMC scheme is used, a transmitter can adjust the amount of transmission data depending on a channel state. That is, when a channel state is poor, a transmitter may adjust the error probability at the receiver to a desired level by increasing the data rate, and when a channel state is good, the transmitter may efficiently transmit at high data rates while adjusting the error probability at the receiver to a desired level. With the use of the channel-aware scheduling resource management method, the transmitter selectively provides a service to a user having a good channel state among a plurality of users, and thus the system capacity may increase as compared with the method of assigning a channel to one user and providing a service to the user with the assigned channel. Such a capacity increase as in the above description is referred to as "multi-user diversity gain". In short, the AMC scheme and the channel-sensitive scheduling scheme are methods that allow a transmitter to apply an appropriate modulation and coding technique at a point of time that is determined to be most efficient based on partial channel state information fed back from a receiver.

When being used with the Multiple Input Multiple Output (MIMO) wireless system using the spatial transmission scheme (such as open loop, closed loop and the like), the AMC scheme, as described above, may include a function of determining the number of spatial layers or the rank of a transmitted signal. In this case, when determining an optimum data rate, the AMC scheme also determines how many layers are used for transmission using the MIMO, not simply considering only a coding rate and a modulating scheme.

The MIMO, which transmits a wireless signal using a plurality of transmission antennas, is classified into Single User MIMO (SU-MIMO) which performs transmission to one UE and a Multi User MIMO (MU-MIMO) which performs transmission to a plurality of UEs using the same time and frequency resource. This is also referred to as spatial division multiple access (SDMA). In the case of the SU-MIMO, a plurality of transmission antennas transmits a wireless signal to one receiver using a plurality of spatial layers. At this time, the receiver should include multiple reception antennas in order to support the multiple spatial layers. In contrast, in the case of the MU-MIMO, multiple transmission antennas transmit a wireless signal to multiple receivers using multiple spatial layers. The MU-MIMO is more advantageous than the SU-MIMO in that the MU-MIMO does not require a receiver equipped with a plurality of reception antennas. However, the MU-MIMO is disadvantageous in that, since wireless signals are transmitted to a plurality of receivers through the same frequency and time resource, interference (multi-user or inter-user interference) may occur between the wireless signals for different receivers.

Meanwhile, in recent years, researches have been actively conducted on switching the next generation system from the Code Division Multiple Access (CDMA), which is a multiple access scheme used in the $2^{nd}$ generation and $3^{rd}$ generation mobile communication system, to the Orthogonal Frequency Division Multiple Access (OFDMA). The 3GPP and 3GPP2 have started their standardizations on the evolved systems employing the OFDMA. It is generally known that the OFDMA scheme, as compared to the CDMA scheme, can expect a capacity increase. One of the several reasons causing the capacity increase in the OFDMA scheme is that the OFDMA scheme may perform scheduling in a frequency domain (Frequency Domain Scheduling). Although a capacity gain is acquired according to the time-varying channel characteristic using the channel-aware scheduling scheme, it is also possible to obtain a higher capacity gain with use of the frequency-varying channel characteristic.

FIG. 1 illustrates a time-frequency resource in an LTE/LTE-A system.

Referring to FIG. 1, a wireless resource, which an eNB transmits to a UE, is divided into a Resource Block (RB) unit on a frequency axis and is divided into a sub-frame unit on a time axis. In the LTE/LTE-A system, the RB generally includes 12 subcarriers and occupies a band of 180 kHz. In the LTE/LTE-A system, the sub-frame is generally configured by 14 OFDM symbol intervals and occupies a time interval of 1 msec. The LTE/LTE-A system may assign a resource in a subframe unit on the time axis and assign a resource in an RB unit on the frequency axis in performing scheduling.

FIG. 2 illustrates a wireless resource of one sub-frame and one RB, which is a minimum unit schedulable in a downlink in the LTE/LTE-A system.

Referring to FIG. 2, a wireless resource includes one sub-frame on a time axis and one RB on a frequency axis. Such a wireless resource includes 12 subcarriers in a frequency region, includes 14 OFDM symbols in a time region, and thus includes 168 inherent frequencies and time positions. In the LTE/LTE-A, each inherent frequency and time position illustrated in FIG. 2 is referred to as a Resource Element (RE). Further, one sub-frame includes two slots, each of the two slots being configured by 7 OFDM symbols.

The following several different types of signals may be transmitted in the wireless resource illustrated in FIG. 2.

1. CRS(Cell Specific Reference Signal): Reference signal transmitted to all UEs belonging to one cell.

2. DeModulation Reference Signal (DMRS): reference signal transmitted to a specific UE.

3. Physical Downlink Shared CHannel (PDSCH): data channel transmitted via a downlink, which is used by an eNB to transmit traffic to a UE and is transmitted using an RE not used for reference signal transmission in the data region of FIG. 2.

4. Channel Status Information Reference Signal (CSI-RS): The CSI-RS is used in measuring a channel state of the reference signal transmitted to UEs belonging to one cell. A plurality of CSI-RSs may be transmitted to one cell.

5. Other control channels (Physical Hybrid ARQ Indicator Channel (PHICH), Physical Control Format Indicator Channel (PCFICH), Physical Downlink Control Channel (PD-CCH)): control channels for providing control information required for a UE to receive a PDSCH or transmitting Acknowledgement (ACK)/Negative Acknowledgement (NACK) for operating Hybrid automatic repeat request (HARQ) for uplink data transmission.

In addition to the signals, the LTE-A system can configure muting such that the CSI-RS transmitted by another eNB can be received without interference by UEs of a corresponding cell. The muting can be applied to a position at which a CSI-RS can be transmitted, and a UE generally skips a corresponding wireless resource and receives a traffic signal. In the LTE-A system, the muting is also referred to as a zero-power CSI-RS as another term. This is because the muting is applied to a CSI-RS position and transmission power is not transmitted.

As illustrated in FIG. 2, the CSI-RS can be transmitted using a part of positions marked by A, B, C, D, E, F, G, H, I, and J according to the number of antennas which transmit the CSI-RS. Further, the muting may be also applied to a part of the positions marked by A, B, C, D, E, F, G, H, I, and J. In particular, a CSI-RS may be transmitted to 2, 4, or 8 REs according to the number of transmission antenna ports. For example, in FIG. 2, the CSI-RS is transmitted to half of the specific pattern when the number of antenna ports is 2, the CSI-RS is transmitted to the entire specific pattern when the number of antenna ports is 4, and the CSI-RS is transmitted using two patterns when the number of antenna ports is 8. In contrast, in a case of the muting, the CSI-RS is always transmitted in one pattern unit. That is, the muting may be applied to a plurality of patterns, but cannot be applied to only a part of one pattern when a muting position does not overlap a CSI-RS position. However, when the CSI-RS positions overlap the muting positions, the muting can be applied to only a part of one pattern.

In a cellular system, a Reference Signal (RS) should be transmitted in order to measure a downlink channel state. In the case of the LTE-A system of the 3GPP, a UE measures a channel state between an eNB and the UE by using a CRS or a CSI-RS transmitted by the eNB. Several factors should be basically considered for the channel state, here, an amount of interference in the downlink is included. The amount of interference in the downlink includes interference signals, thermal noise, etc. generated by antennas belonging to a neighbor eNB, and is an important factor for a UE to determine a channel situation of the downlink. As an example, when an eNB having one transmission antenna transmits a signal to a UE having one reception antenna, the UE should determine an energy per one symbol which can be received via a downlink and an amount of interference to be simultaneously received from a section which receives the corresponding symbol on the basis of a reference signal which has been received from the eNB, so as to determine a Signal to Noise plus Interference Ratio (SNIR). The SNIR corresponds to a value obtained by dividing a power of a received signal by interference plus noise signal power. In general, a higher SNIR may result in better reception performance and a higher data rate (if single-user decoding is applied). The determined SNIR, a value corresponding thereto, or the maximum data rate supportable by the corresponding SNIR is reported to the eNB (also called channel quality indicator CQI), and thus the eNB can determine the data rate at which to transmit data to the UE via a downlink.

In a case of a general mobile communication system, an eNB equipment is disposed in a central point of each cell, and the corresponding eNB equipment communicates with a terminal (UE) using one or more antennas positioned in a limited place. A mobile communication system in which antennas belonging to one cell are arranged in the same location is referred to as a Centralized Antenna System (CAS). In contrast, a mobile communication system in which antennas (Remote Radio Heads; RRHs) belonging to one cell are located at distributed positions in the cell is called a Distributed Antenna System (DAS).

FIG. 3 illustrates an arrangement of antennas at distributed positions in a typical distributed antenna system.

Referring to FIG. 3, a DAS formed by two cells 300 and 310 is illustrated. The cell 300 is formed by one high-power antenna 320 and four low-power antennas 340. The high-power antenna 320 provides a minimum service to the entire area included in the cell area. In contrast, the low-power antennas 340 can provide a service based on a high data rate but only to UEs in a limited area within a cell. Further, the high-power antenna 320 and the low-power antennas 340 can operate according to scheduling and wireless resource allocation of a central controller while being connected to the central controller, as indicated by reference numeral 330. In the DAS, one or more antennas may be arranged at a location of one antenna which is geographically separated (one or more antennas may be co-located (antenna group) or distributed). In this way, in the present invention, in the DAS, an antenna or antennas arranged in the same location is called an antenna group (RRH group).

In the DAS as illustrated in FIG. 3, a UE receives a signal from one antenna group which is geographically separated, and a signal transmitted from other antenna groups acts as interference.

FIG. 4 illustrates an occurrence of interference in the case of transmission to different UEs according to each antenna group in a distributed antenna system.

Referring to FIG. 4, a first UE (UE1) 400 receives a traffic signal from an antenna group 410. In contrast, a second UE (UE2) 420 receives a traffic signal from an antenna group 430, a third UE (UE3) 440 receives a traffic signal from an antenna group 450, and a fourth UE (UE4) 460 receives a traffic signal from an antenna group 470. The UE1 400 receives a traffic signal from the antenna group 410 while receiving interference from the other antenna groups 430, 450, and 470 which transmit a traffic signal to the other UEs 420, 440, and 460, respectively. That is, a signal transmitted from the antenna groups 430, 450, and 470 may cause an interference effect to the UE1 400.

In general, interference generated by another antenna group in a distributed antenna system includes two types of interference as follows.

Inter-cell interference: Interference generated between antenna groups belonging to different cells.

Intra-cell interference: Interference generated between antenna groups belonging to the same cell.

An example of intra-cell interference for the UE1 400 of FIG. 4 is interference generated in the antenna group 430 belonging to the same cell. Further, an example of inter-cell interference for the UE1 400 is interference generated between the antenna groups 450 and 470 belonging to neighboring cells. The inter-cell interference and the intra-cell interference are received by a UE at the same time so as to disturb data channel reception of the UE and lowering the SNIR.

In general, when a UE receives a wireless signal, a desired signal is received together with noise and interference. That is, the reception signal may be expressed by Equation (1) as follows.

$$r = s + noise + interference \quad (1)$$

In Equation (1), "r" denotes a reception signal, "s" denotes a transmission signal, "noise" denotes noise having the Gaussian distribution, and "interference" denotes an interference signal generated in a wireless communication system. The interference signal may be generated in the following situations.

Interference at neighboring transmission points: when a signal transmitted by a neighboring cell or a neighboring antenna in the DAS generates interference to a desired signal.

Interference at the same transmission point: when MU-MIMO transmission is performed at one transmission point using a plurality of antennas, when signals for different users generate interference therebetween.

A value of the SNIR is changed according to the magnitude of the interference, thereby influencing reception performance. In general, the interference is a factor which causes most significantly system performance deterioration, and the system performance depends on how to appropriately control the interference. In order to control interference, various standard technologies for supporting coordinated multi-point (COMP) transmission and reception, which is a type of collaborative communication, have been introduced in LTE and LTE-A. In the COMP transmission, a network comprehensively and centrally controls transmission of a plurality of eNBs and transmission points so as to determine the magnitude of the interference and existence of the interference in a downlink and an uplink. As an example, when there are two eNBs, a central controller of the network can stop signal transmission from a second eNB (among the two eNBs) such that interference is not generated in a UE receiving a signal from a first eNB (among the two eNBs).

A wireless communication system performs forward error correction (FEC) coding in order to correct an error generated in a transmission/reception process. In the LTE/LTE-A system, a convolution code, a turbo code, etc. are used for the error correction coding. In order to improve decoding performance of the FEC coding, a receiver does not use a hard decision but uses a soft decision when decoding a modulated modulation symbol such as Quadrature Phase-Shift Keying (QPSK), 16-Quadrature Amplitude Modulation (QAM), and 64-QAM. All of the modulation mentioned schemes QPSK, 16 QAM and 64 QAM use complex symbols, e.g. two bits {(0,0), (0,1), (1,0), (1,1)} represent one QPSK symbol ((1,I,−1,−I)). When a transmission port transmits "+1" or "−1", a receiver employing the hard decision selects and outputs either "+1" or "−1" for a received signal. In contrast, a receiver employing the soft decision outputs both information on which of "+1" and "−1" is received for a received signal and the reliability of the corresponding decision. Such reliability information may be used to improve decoding performance in the process of decoding.

A receiver employing soft decision generally uses a log likelihood ratio (LLR) to calculate a soft output value. When a Binary Phase Shift Keying (BPSK) modulation scheme is used in which the transmission signal is either "+1" or "−1", the LLR is defined by Equation (2) as follows.

$$LLR = \log \frac{f(r \mid s = +1)}{f(r \mid s = -1)} \quad (2)$$

In Equation (2), "r" denotes a reception signal, and "s" denotes a transmission signal. This also applies for the higher order modulation schemes on a bit level, e.g., for both bits representing one QPSK symbol. Further, the conditional probability density function $f(r|s=+1)$ is a probability density function of the reception signal under a condition that "+1" is transmitted as the transmission signal. Likewise, the conditional probability density function $f(r|s=-1)$ is a probability density function of the reception signal under a condition that "−1" is transmitted as the transmission signal. For any other modulation such as QPSK, 16QAM, or 64QAM, an LLR may also be mathematically expressed in the same manner. The conditional probability density function has a Gaussian distribution when there is no interference.

FIG. 5 illustrates a conditional probability density function.

Referring to FIG. 5, a graph 500 corresponds to the conditional probability density function $f(r|s=-1)$, and a graph 510 corresponds to the conditional probability density function $f(r|s=+1)$. For example, when a value of a reception signal is identical to a value depicted by reference point 520, a receiver calculates an LLR as log(f2/f1) using such conditional probability density functions, wherein f1 is the function value of the probability density function 500 at the abscissa value 520 and wherein f2 is the function value of the probability density function 510 at the abscissa value 520. The conditional probability density functions as illustrated in FIG. 5 correspond also to cases where noise and interference are both modeled with the Gaussian distribution.

In a mobile communication system such as the LTE/LTE-A system, an eNB transfers several tens of bits or more of information to a UE in one PDSCH transmission, At this time, the eNB encodes information to be transmitted to the UE, modulates the encoded information in schemes such as QPSK, 16QAM, and 64 AQM, and then transmits the modulated information. As a result, the UE, which has received the PDSCH, generates LLRs for several tens or more of encoded symbols (e.g. QPSK=2 bits, 16 QAM 4 bits, 64 QAM==6 bits) in the process of demodulating several tens or more of modulated symbols and transfers the generated LLRs to a decoder.

FIG. 6 illustrates a conditional probability density function when it is assumed that a reception signal is transmitted in the BPSK modulation scheme and an interference signal is also transmitted in the BPSK modulation scheme.

In general, noise samples are modeled with a Gaussian distribution, but interference may not Gaussian distributed depending on the situation. The representative reason that the interference is not Gaussian distributed is that the interference is a wireless signal for another receiver, which is unlike noise. That is, since "interference" in Equation (1) is a wireless signal for another receiver, the interference is transmitted in a state in which the modulation schemes such as the BPSK, the QPSK, the 16QAM, and the 64QAM are applied thereto. As an example, when an interference signal is modulated in the "BPSK", the interference has a probability distribution having a value of one of "+k" and "−k" in the same probability. In the above, "k" is a value determined by a signal intensity attenuation effect of a wireless signal.

Meanwhile, in FIG. 6, it is assumed that noise accords with a Gaussian distribution.

The conditional probability density functions in FIG. 6 are different from the conditional probability density functions in FIG. 5. In FIG. 6, the curve 620 corresponds to a conditional probability density function $f(r|s=-1)$, and the curve 630 corresponds to a conditional probability density function $f(r|s=+1)$. Further, the amplitude of the shift 610 is determined according to the intensity of the interference signal and is determined according to the influence on a wireless signal. For example, when a value of a reception signal is identical to a value depicted by reference point 600, a receiver calculates an LLR as log(f4/f3) using such conditional probability density functions, wherein f3 is the function value of the probability density function 620 at the abscissa value 600 and wherein f4 is the function value of the probability density function 630 at the abscissa value 600. Since the conditional probability density function values are different from each other, the LLR has a value different from that of the LLR in FIG. 5. That is, the LLR obtained by considering a modulation scheme of an interference signal with a non-Gaussian distribution (as in FIG. 6) is different from the LLR calculated on the basis of an assumption that interference accords with the Gaussian distribution (as in FIG. 5).

FIG. 7 illustrates a conditional probability density function when it is assumed that a reception signal is transmitted in the BPSK modulation scheme and an interference signal is also transmitted in the 16QAM modulation scheme.

FIG. 7 illustrates that a conditional probability density function may change according to a difference in the modulation scheme of interference. In all examples illustrated in FIG. 6 and FIG. 7, a reception signal is transmitted in the BPSK modulation scheme. However, in FIG. 6, the interference corresponds to the BPSK, and in FIG. 7, the interference corresponds to the 16QAM. That is, even when the modulation schemes of a reception signal is identical to each other, the conditional probability density functions differ from each other according to the modulation schemes of an interference signal, and as a result, the calculated LLRs differ from each other.

As described in parts relating to FIGS. 5, 6, and 7, the LLR has different values according to how a receiver assumes and calculates the interference. In order to optimize reception performance, the LLR should be calculated using the conditional probability density function on which a statistical characteristic of an actual interference is reflected, i.e. the LLR calculation should depend on a statistical characteristic (e.g. Gaussian characteristic, BPSK modulated characteristic, 16QAM modulated characteristic or the like) of an actual interference. Further, the LLR should be calculated after an interference signal is cancelled from a reception signal in advance.

For example, when an interference signal is transmitted in the BPSK modulation scheme, the LLR should be calculated on the basis of the assumption that interference is transmitted from a receiver in the BPSK modulation scheme or the LLR should be calculated after interference modulated in the BPSK is cancelled. However, in a case where an interference is transmitted in the BPSK modulation scheme, when the LLR is calculated without an interference cancellation procedure on the basis of an assumption that the interference has the Gaussian distribution or is transmitted in a different modulation scheme such as the 16QAM modulation scheme from a receiver, a non-optimized LLR value is calculated, and thus, reception performance cannot be optimized.

SUMMARY OF THE INVENTION

The present invention is made to address the above-mentioned problem.

In detail, an aspect of the present invention is to provide a method and an apparatus for transmitting interference related control information in order to improve reception performance of a UE which receives a downlink signal, in a cellular mobile communication system based on an Long Term Evolution-Advanced (LTE-A) system.

The technical subjects pursued in the present invention may not be limited to the above mentioned technical subjects, and other technical subjects which are not mentioned may be clearly understood, through the following descriptions, by those skilled in the art of the present invention.

In order to achieve the above-described aspect, a communication method of a UE according to an embodiment of the present invention comprises receiving information on a resource allocation unit (interchangeably referred to as resource allocation parameter set or interchangeably referred to as resource block unit) of an interference signal from an eNB; performing blind detection using information on the resource allocation unit of the interference signal; performing error-correcting coding using a transmission parameter for interference and a result obtained by the blind detection; and decoding reception data.

In order to achieve the above-described aspect, a communication method of an eNB according to an embodiment of the present invention may comprise configuring an interference cell for a UE and configuring information on a resource allocation unit of an interference signal to be transmitted to the UE; and transmitting the information on the resource allocation unit of the interference signal to the UE.

According to an embodiment of the above-described methods, the information on the resource allocation unit of the interference signal comprises information on whether the eNB performs a Network Assisted Interference Cancellation and Suppression (NAICS) (also referred to as Successive Interference Cancellation (SIC)) operation or not.

According to an embodiment of the above-described methods, the information on the resource allocation unit of the interference signal comprises information on whether type-2 distribution resource allocation is not used or not or whether a resource is allocated at least in a Physical Resource Block (PRB)-pair unit in an interference cell or not.

According to an embodiment of the above-described methods, the information on the resource allocation unit of the interference signal comprises information on whether only a type-0 RA method is used or not or whether a resource is allocated in a Physical Resource Block Group (PRBC) unit in an interference cell or not.

According to an embodiment of the above-described methods, the information on the resource allocation unit of the interference signal comprises information indicating that a resource is allocated in an M PRB-pair unit in an interference cell.

According to an embodiment of the above-described methods, the receiving of the information on the resource allocation unit of the interference cell comprises receiving a higher signal including information on the resource allocation unit of the interference cell from the eNB.

In order to achieve the above-described aspect, a UE according to an embodiment of the present invention comprises a communication unit that transmits/receives a signal to/from an eNB; and a controller that makes a control to receive information on a resource allocation unit of an interference signal from the eNB, perform blind detection using the information on the resource allocation unit of the interference signal, perform error-correcting coding using a transmission parameter for interference and a result obtained by the blind detection, and decodes reception data.

In order to achieve the above-described aspect, an eNB according to an embodiment of the present invention comprises a communication unit that transmits/receives a signal to/from a UE; and a controller that makes a control to configure an interference cell for the UE, configure information on a resource allocation unit of an interference signal to be transmitted to the UE, and transmit the information on the resource allocation unit of the interference signal to the UE.

According to an embodiment of the above-described devices, the information on the resource allocation unit of the interference signal comprises information on whether the eNB performs a NAICS operation or not.

According to an embodiment of the above-described devices, the information on the resource allocation unit of the interference signal comprises information on whether type-2 distribution resource allocation is not used or not or whether a resource is allocated at least in a PRB-pair unit in an interference cell or not.

According to an embodiment of the above-described devices, the information on the resource allocation unit of the interference signal comprises information on whether only a type-0 RA method is used or not or whether a resource is allocated in a PRBG unit in an interference cell or not.

According to an embodiment of the above-described devices, the information on the resource allocation unit of the interference signal comprises information indicating that a resource is allocated in an M PRB-pair unit in an interference cell.

According to an embodiment of the above-described devices, the receiving of the information on the resource allocation unit of the interference cell comprises receiving a higher signal including information on the resource allocation unit of the interference cell from the eNB.

According to an embodiment of the above-described UE, the controller makes a control to receive a higher signal including information on the resource allocation unit of the interference cell from the eNB.

According to an embodiment of the above-described eNB, the controller makes a control to transmit a higher signal including information on the resource allocation unit of the interference cell to the UE In accordance with an embodiment of the present invention, in a cellular mobile communication system based on an LTE-A system, a reception performance of a UE which receives a downlink can be improved because the LLR values are correctly computed compared to the Gaussian interference assumption and the error probability is thereby significantly reduced. Further, the UE receives interference related control information from an eNB, thereby improving a reception performance of the UE. Accordingly, the LIE cancels and suppresses interference, thereby improving a reception performance of the UE.

Further, in accordance with an embodiment of the present invention, while the number of times of performing blind detection is reduced (by providing side information—i.e. information on a resource allocation unit—to the UE, the blind detection step is simplified while success probability increases), the probability of success that a transmission parameter is identified when blind detection is performed one time can be increased. Further, an operation of allocating a resource by the eNB is limited or information on resource allocation of the corresponding interference cell is notified to the UE so that the UE can perform the blind detection while having a larger RA granularity. Further, the complexity and the probability of success the blind detection can be increased only with the limited scheduling restraint. The above-mentioned properties are achieved by providing the mentioned side information.

Effects obtainable from the present invention may not be limited to the effects mentioned above, and other effects which are not mentioned may be clearly understood, through the following descriptions, by those skilled in the art of the present invention.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE INVENTION

Hereinafter, various embodiments of the present invention will be described in greater detail with reference to the accompanying drawings. In the following description of the present invention, a detailed description of known functions or configurations incorporated herein will be omitted when it may make the subject matter of the present invention rather unclear. The terms which will be described below are terms defined in consideration of the functions in the present disclosure, and may be different according to users, intentions of the users, or customs. Therefore, the definitions of the terms should be determined based on the contents throughout the specification.

Further, the detailed description of embodiments of the present invention is made mainly based on a wireless communication system based on OFDM, particularly 3GPP EUTRA (evolved UMTS Terrestrial Radio Access) standard, but the subject matter of the present invention can be applied to other communication systems having a similar technical background and channel form after a little modification without departing from the scope of the present invention and the above can be determined by those skilled in the art.

It will further be understood that the features, functions, definition and explanations disclosed with respect to FIGS. 1 to 7 also apply mutatis mutandis to the aspects and embodiments of the present invention. For example, the definitions and explanations given with respect to the calculation of the LLR with respect to FIGS. 5 to 7 also apply to the following explanations given with respect to FIG. 8 if not expressed otherwise.

Figure 1:
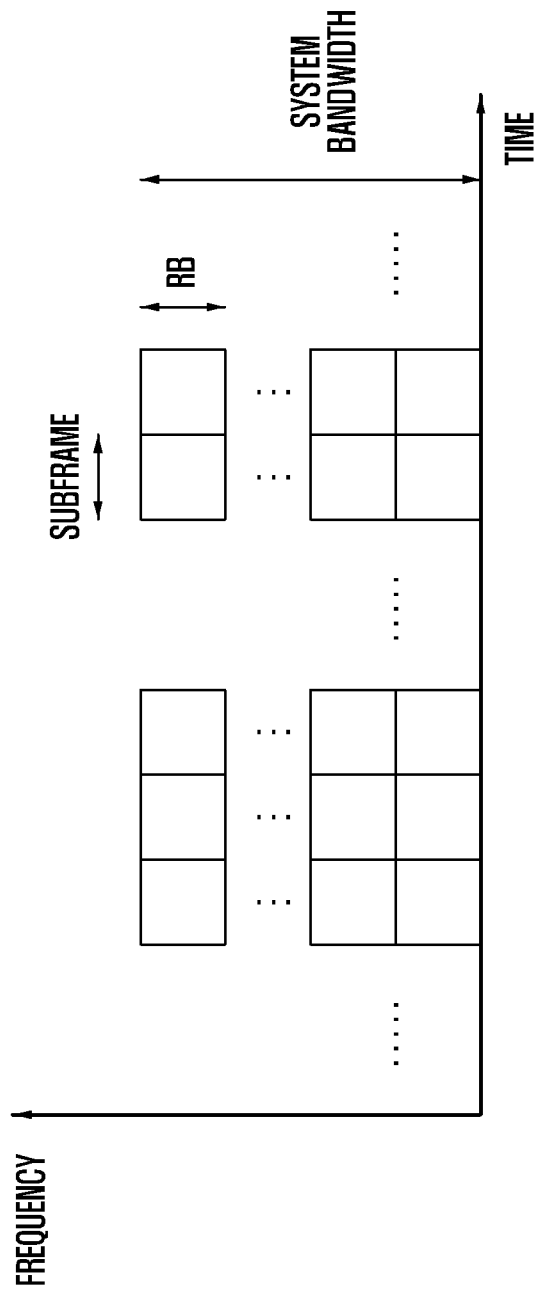
FIG. 1 illustrates a time-frequency resource in an LTE/LTE-A system.
Figure 2:
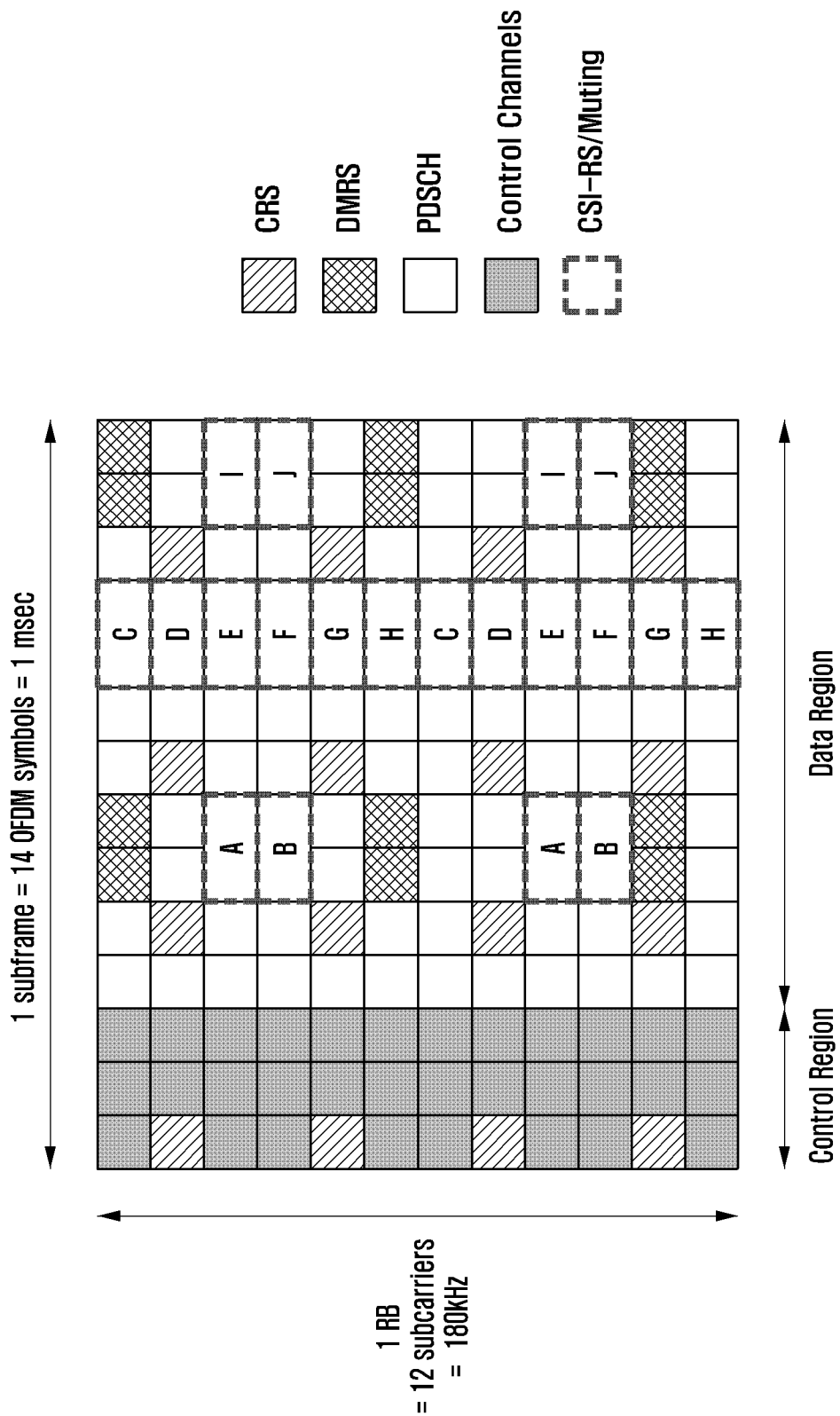
FIG. 2 illustrates a wireless resource of one sub-frame and one RB, which is a minimum unit schedulable in a downlink in the LTE/LTE-A system.
Figure 3:
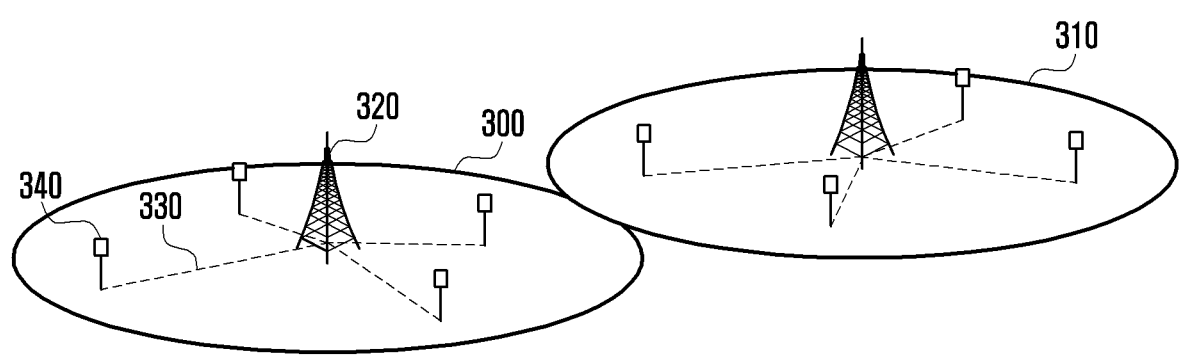
FIG. 3 illustrates an arrangement of antennas at distributed positions in a general distributed antenna system.
Figure 4:
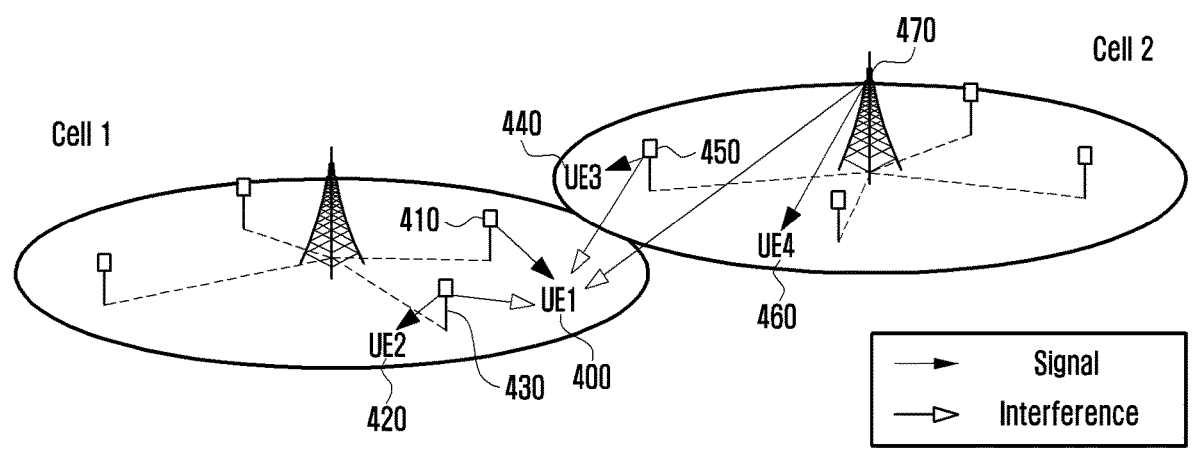
FIG. 4 illustrates an occurrence of interference in the case of transmission to different UEs according to each antenna group in the distributed antenna system.
Figure 5:
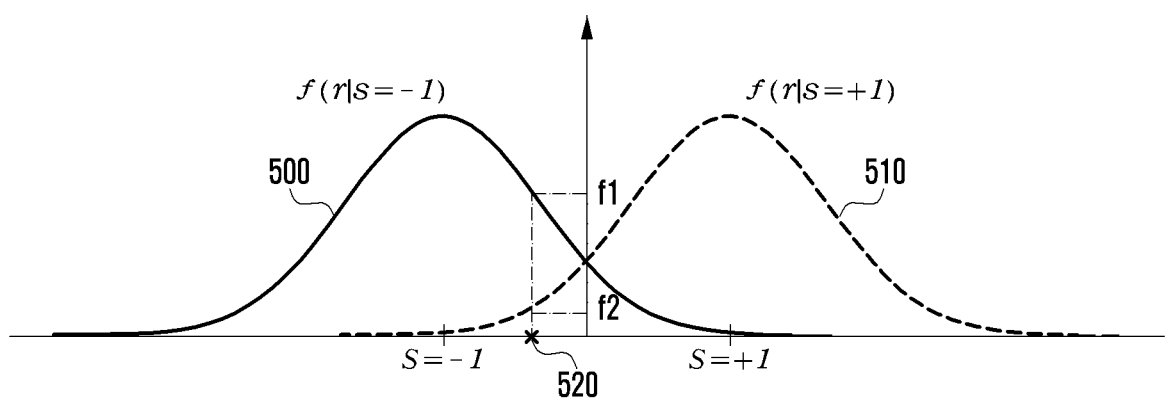
FIG. 5 illustrates a conditional probability density function.
Figure 6:
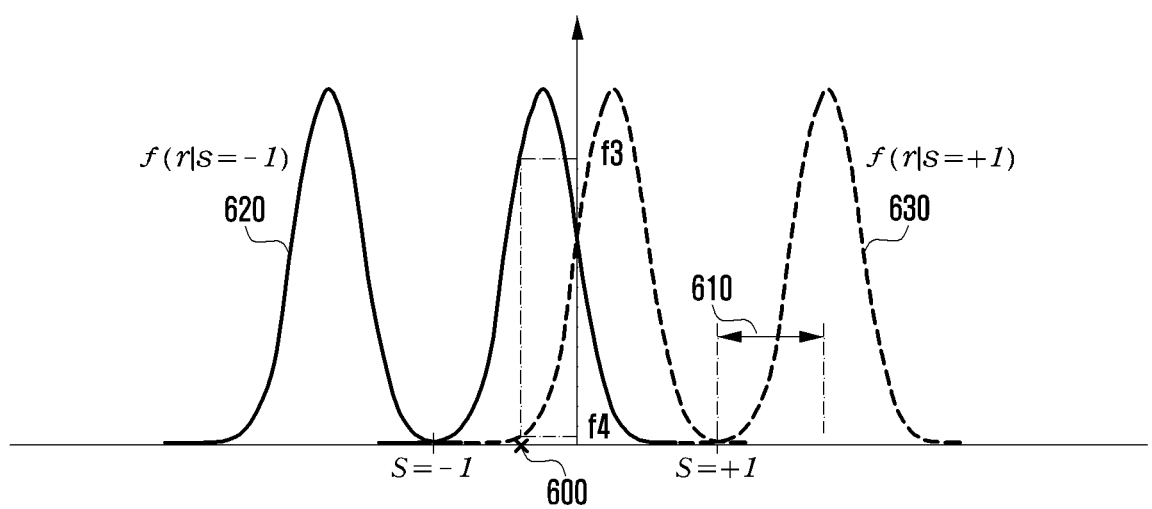
FIG. 6 illustrates a conditional probability density function when a reception signal is transmitted in the BPSK modulation scheme and an interference signal is also transmitted in the BPSK modulation scheme.
Figure 7:
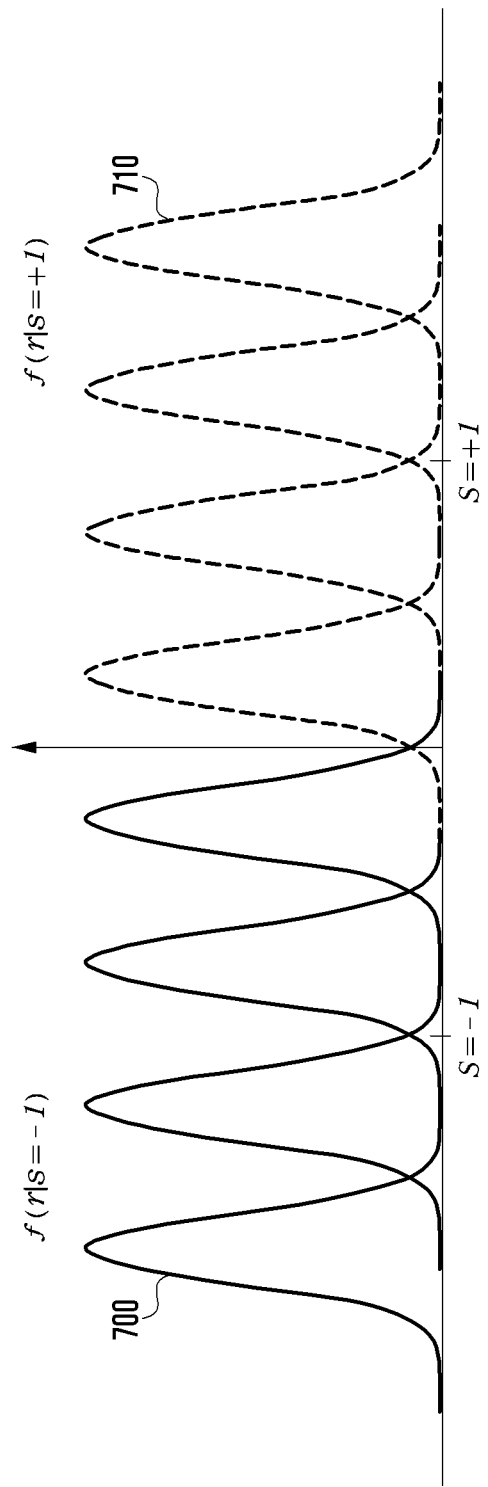
FIG. 7 illustrates a conditional probability density function when it is assumed that a reception signal is transmitted in the BPSK modulation scheme and an interference signal is also transmitted in the 16QAM modulation scheme.
Figure 8:
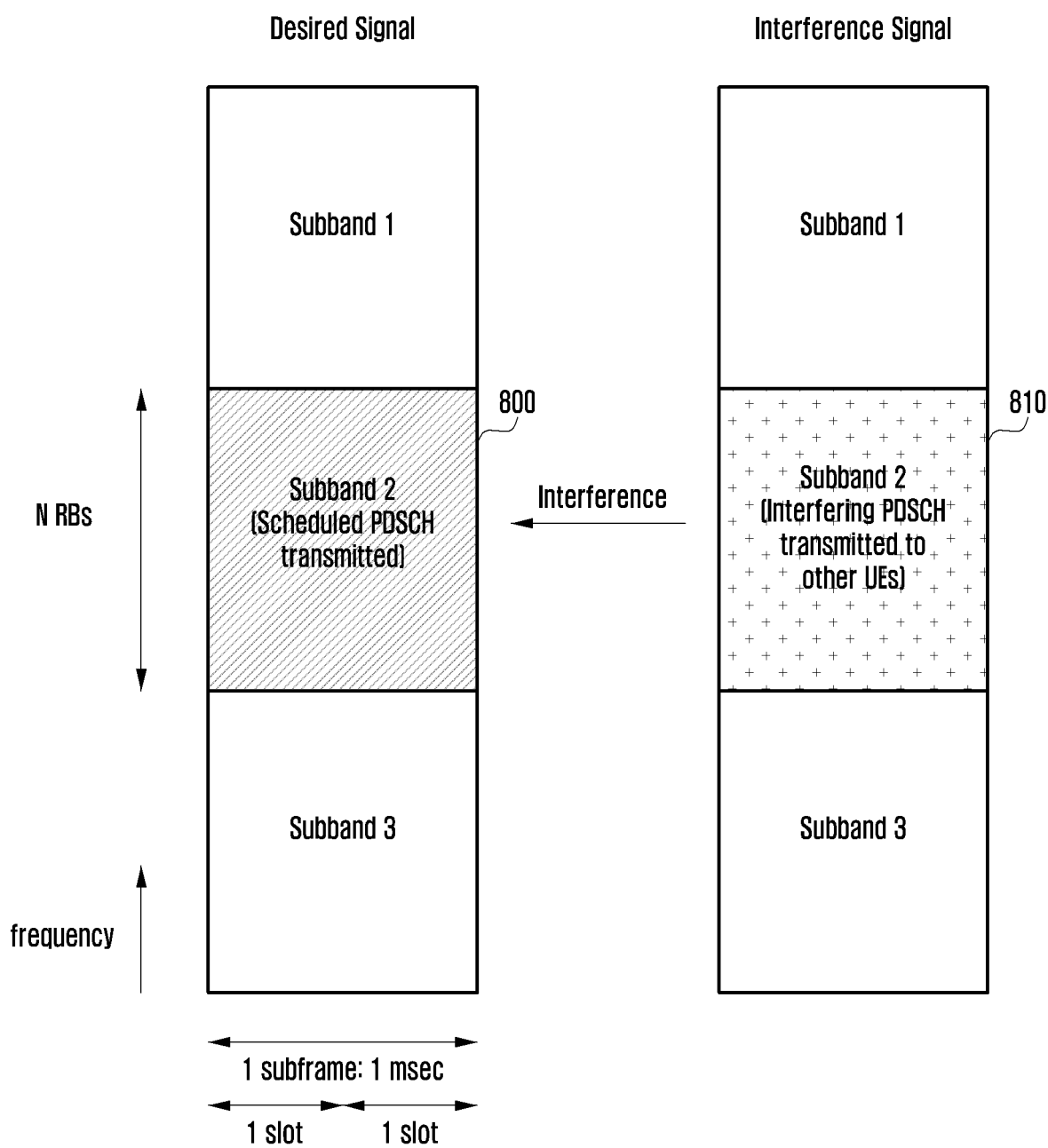
FIG. 8 illustrates a situation in which interference occurs in the LTE/LTE-A system according to an embodiment of the present invention.

FIG. 8 illustrates a situation in which interference occurs in the LTE/LTE-A system according to an embodiment of the present invention.

Referring to FIG. 8, a UE is adapted to receive a wireless signal 800. At this time, an interference signal 810 which has been transmitted for other UEs generates interference with respect to the UE. In the example illustrated in FIG. 8, it is assumed that a signal desired by a UE to be received and an interference signal are transmitted to N RBs.

In FIG. 8, in order to improve a reception performance in a process of detecting the signal desired by a UE to be received, an LLR should be calculated after an interference signal 810 is cancelled and/or after a conditional probability density function is accurately calculated by taking into account a statistical characteristic of the actual interference signal 810. In order to allow the UE to cancel the interference signal 810 or to accurately calculate the probability density function based on a statistical characteristic of the actual interference signal, the UE should identify at least the modulation scheme of the actual interference signal and the reception intensity of the interference signal. In the case of the LTE/LTE-A system, in order to identify the modulation scheme of the interference signal and the reception intensity of the reception signal, the UE should be able to identify at least one of the following transmission parameters with respect to interference.

Cell-specific Reference Signal (CRS) information of interference cell:
    Cell Identifier
    Number of CRS antenna ports
    MBSFN (Multicast/Broadcast over a Single Frequency Network) subframe information
    Information on energy ratio per RE of data Resource Element (RE) and CRS RE
    $P_A$, $P_B$ as per [TS 36.213 Section 5.2]
Network deployment information of interference cell:
    Synchronization information between eNBs
    Cyclic prefix information
    Sub-frame (or slot) number information
Transmission Mode (TM) of interference PDSCH
PDSCH related dynamic transmission information of interference:
Physical Downlink Control CHannel (PDCCH) transmission area (or Physical Downlink Shared CHannel (PDSCH) start symbol index)
    Modulation order
    Rank Indication (RI): Information on number of transmission streams of interference PDSCH
    Precoding Matrix Indicator (PMI): Precoding information of interference PDSCH
        DMRS Information (DMRSI)
            DMRS Antenna Port information (DMRS-AP)
            DMRS sequence information (virtual cell ID, scrambling ID)

That is, according to an embodiment of the present invention, the UE is adapted to identify at least one of the above-mentioned group transmission parameters with respect to interference, and adapted to identify the modulation scheme of the interference signal and/or the reception intensity of the reception signal from the identified parameter(s).

In the LTE/LTE-A system, a value, which is possible as a transmission mode of the interference PDSCH, among the transmission parameters for the interference is from transmission mode (TM) 1 to TM10, and the PDSCH transmission method for each mode references [3GPP TS 36.213, Table 7.1-5]. A part of the transmission parameters for the interference may be transmitted from an eNB to a UE through separate signaling and another part thereof may be directly detected using the blind detection method by the UE. According to an embodiment of the present invention, the group of transmission parameters for the interference to be transmitted from an eNB to a UE through separate signaling includes at least one selected from CRS, network deployment, and TM of interference PDSCH.

According to an embodiment of the present invention, the group of transmission parameters for the interference to be directly detected using the blind detection method by the UE includes at least one selected from PDSCH related dynamic transmission information of interference.

According to an embodiment of the present invention, the separate signaling may be implemented in the same way as the PDSCH TM signaling for the current cell in IE AntennaInfo field transmissionMode [3GPP TS TS 36.331].

Further, depending on embodiments, when an eNB signals a candidate set of possible values which the corresponding parameter can have with respect to a specific transmission parameter to a UE, the UE can detect a corresponding transmission parameter value of an interference signal using the blind detection method among candidates of transmitted possible parameter values. In an embodiment of the present invention, it is assumed that parameters corresponding to CRS information of an interference cell, network deployment information of an interference cell, and transmission mode information of an interference PDSCH, among the transmission parameters for interference, and PDCCH transmission area information are notified to a UE through higher signaling by an eNB or are previously known by the UE through the blind detection method. Further, the description will be made considering a method of performing blind detection of a modulation order/Rank Indication (RI)/Precoding Matrix Indicator (PMI) or a modulation order/DMRSI of interference in order to enable the UE to remove the actual interference signal or to calculate an accurate LLR (and for doing so, to calculate a conditional probability density function which takes a statistic characteristic of the interference signal into account, by a UE. However, the present invention is not limited thereto, and depending on an embodiment, the modulation order/RI/PMI or the modulation order/DMRSI may be detected through joint blind detection together with a part of other transmission parameters for interference.

According an embodiment of the present invention, it is assumed that parameters corresponding to CRS information of an interference cell and network deployment information of an interference cell, among the transmission parameters for interference, and PDCCH transmission area information, are notified to a UE through higher signaling by an eNB or are previously known by the UE through the blind detection method. Further, when the transmission mode of an interference PDSCH may be a part of TM1 to TM6 which operate on the basis of the CRS, the UE performs the blind detection which identifies modulation order/RI/PMI information for interference in order to remove an interference signal or calculate a conditional probability density function on which a statistical characteristic of an interference signal is reflected.

Meanwhile, a reception signal of a UE can be expressed by Equation (3) in order to describe a method of performing the blind detection of the modulation order/RI/PMI for an interference signal by the UE.

$$y_k = H_k^S x^S + H_k^I x^I + w \qquad (3)$$

In Equation (3), $H_k^S$ denotes a channel matrix to a UE from an eNB which the UE accesses in a $k^{th}$ RE and $x^S$ denotes a transmission signal vector transmitted to a UE. Further, $H_k^I$ denotes a channel matrix through which an interference signal is transmitted in the $k^{th}$ RE, $X^I$ denotes an interference signal vector, and w denotes the Gaussian noise vector having distribution of $\sigma^2$.

The Approximated Maximum Likelihood (AML) detection method, which is an example of methods of performing the blind detection of a modulation order/RI/PMI for an interference signal by a UE, may be expressed by Equation (4).

$$\{\hat{R}, \hat{P}, \hat{S}\} = \qquad (4)$$

$$\arg\max_{\{R, P_k, S_n\}} \left( \frac{1}{N_{RE}} \sum_{k=1}^{N_{RE}} \left( -\frac{1}{\sigma^2} \| y_k - \hat{H}_k^I P_R S_{min}^{P_k} \|^2 \right) - \ln(\pi\sigma^2 |S_n|) \right)$$

In Equation (4), $\hat{H}_k^I$ denotes a matrix value obtained by estimating a channel matrix through which an interference signal is transmitted, and is estimated by a CRS for an interference cell. Further, R denotes transmission rank values applicable to an interference signal, and $P_R$ denotes precoding matrices possible for the rank value of the corresponding R. Here, all possible ranks and precoding matrices which are defined with respect to the number of CRS antenna ports in the LTE/LTE-A may be considered to be the transmission rank applicable to an interference signal and the precoding matrices possible therefor. Alternatively, a set of possible ranks and precoding matrices which are transmitted in a bitmap form through a higher signal may be considered to be the transmission rank applicable to an interference signal and the precoding matrices possible therefor. That is, when it is identified that an interference cell has M CRS antenna ports by identifying CRS information of the interference cell, a higher signal for a set of the possible transmission rank and the precoding matrices expresses whether the precoding matrix defined for each of the ranks from 1 to M can be used or not as 1 or 0, and then a bitmap for each of the ranks can be transmitted in a rank order in a continuous contacting form. For example, when the CRS of an interference cell for a specific UE has 2 CRS antenna ports, a higher signal expressed as a bitmap having 7 bits can be transmitted from an eNB to a UE in order to allow the corresponding UE to identify whether the ranks 1 and 2 among the possible ranks defined in the LTE/LTE-A and 4 precoding matrices and 3 precoding matrices possible therefor are used. In contrast, in a case where a specific UE identifies that an interference cell has 2 CRS antenna ports by identifying CRS information of the interference cell, when the UE does not receive a separate higher signal for transmission ranks and precoding matrices applicable to an interference signal, the AML detection method, which uses Equation (4) for the ranks 1 and 2 among the possible ranks defined in the LTE/LTE-A and 4 precoding matrices and 3 precoding matrices defined therefor, can be applied.

In addition, in Equation (4), $S_n$ denotes a signal constellation for a modulation order n, and in a case of the LTE/LTE-A, n may be 2, 4, 6 (or 8), and the QPSK, the 16QAM, 64QAM, (or 256QAM) are applied to these cases, respectively. Further, $|S_n|$ denotes the number of symbols in the signal constellation, is calculated as $2^n$ with respect to each value of n. Further, $S_{min}^{P_R}$ denotes a symbol having a minimum Euclidean distance from a reception vector among symbols in the signal constellation for the given rank and the given precoding matrix and can be represented by Equation (5).

$$S_{min}^{P_R} = \arg\min_{s \in S_n} \| y_k - H_k^I P_R s \|^2 \qquad (5)$$

Finally, when $N_{RE}$ and a set of RE samples to be used for the blind detection in Equation (4) are determined, the UE can perform the blind detection of a modulation order/RI/PMI through the AML method. At this time, the same modulation order/RI/PMI should be applied to all sets of RE samples to be used by the UE for the blind detection of a modulation order/RI/PMI and the sets should have the same electric power level. Thus, the UE should perform the blind detection using only pure PDSCH REs except for the CRS, the DMRS, the PDSCH, the control channel, the CSI-RS, and the muting, etc. in a basic unit (also referred to as resource allocation unit) of interference PDSCH scheduling.

Depending on the embodiment, herein, a basic unit of the interference PDSCH scheduling may be determined to be one RB or a set of a plurality of RBs according to a system.

In the present invention, a method of identifying a basic unit of an interference PDSCH scheduling, applying the blind detection in the corresponding basic unit, and then removing an interference signal, so as to calculate an LLR or accurately calculating an LLR (without prior removal of the interference signal) by using a conditional probability density function for which a statistical characteristic of an interference signal is taken into account, thereby improving a reception performance, by a UE will be described.

In the LTE/LTE-A system, three types of Resource Allocation (RA) methods have been defined. That is, the UE can receive allocation of a resource in three methods of Type-0, Type-1, and Type-2, and an RA granularity of a resource for each case, which can have the same transmission parameter in a continuous time-frequency resource, is defined as follows.

RA granularity for Type-0 RA: Physical Resource Block Group (PRBG)
RA granularity for Type-1 RA: Physical Resource Block pair (PRB pair)
RA granularity for Type-2 RA:
  Localized resource allocation scheme: PRB pair
  Distributed resource allocation scheme: PRB FIG. 9 is a concept view illustrating a PRB, a PRB pair, and a PRBG according to an embodiment of the present invention.

Figure 9:
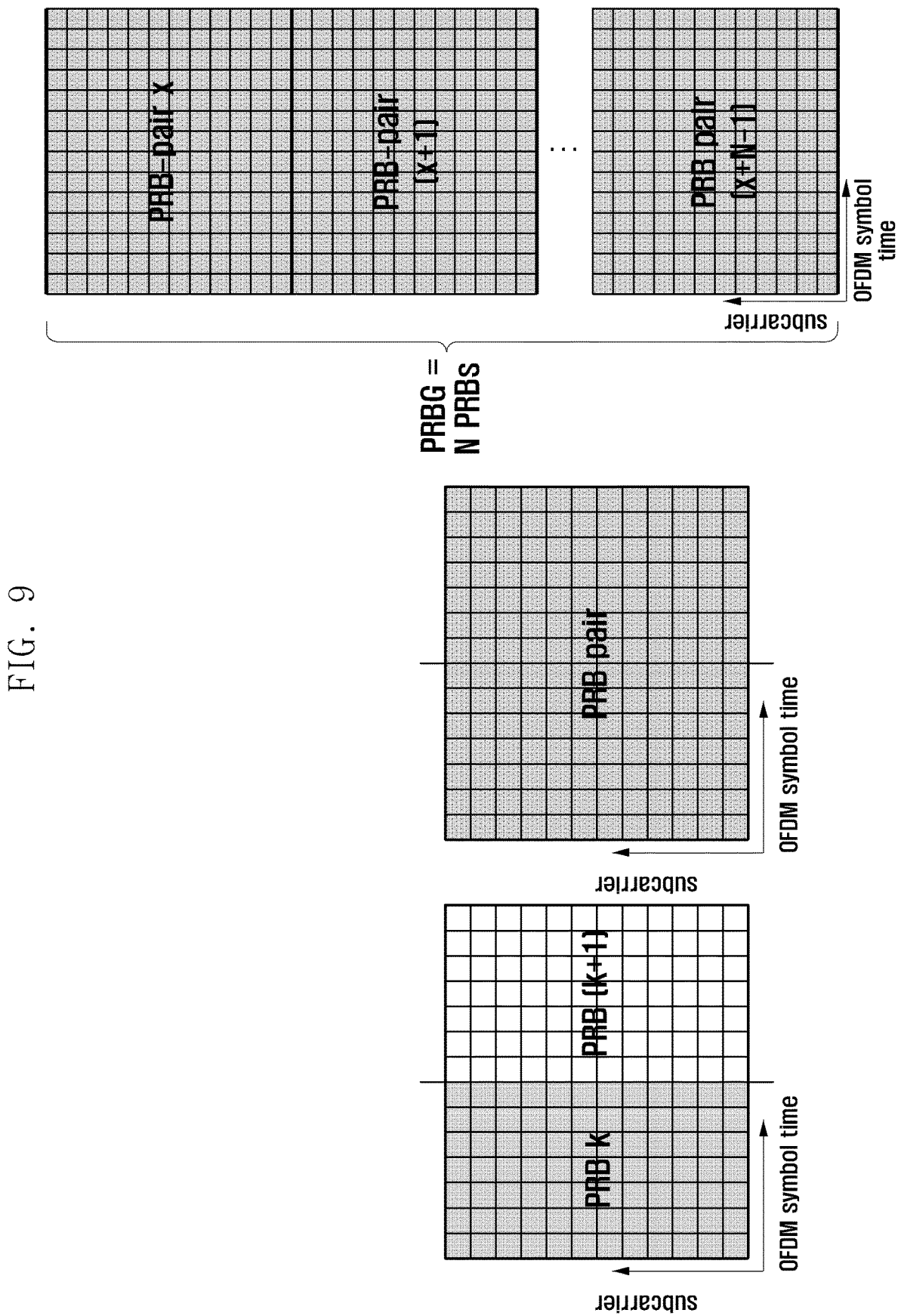
FIG. 9 is a concept view illustrating a PRB, a PRB pair, and a PRBG according to an embodiment of the present invention.

Referring to FIG. 9, in the aforementioned three resource allocation methods, the PRB is configured by 7 continuous OFDM symbols (slots) on a time axis and 12 sub-carriers (RBs) on a frequency axis. Further, two PRBs on the same continuous frequency on the time axis constitute one PRB pair. Further, N PRB pairs continuous on the frequency axis constitute a PRBG. At this time, in FIG. 9, one lattice, which is an RE, corresponds to one OFDM symbol on the time axis and one sub-carrier on the frequency axis.

The number N of PRB pairs constituting the PRBG among a resource allocation minimum unit for the specific UE is a function of the number of entire RBs used in a downlink of a system and is determined by Table 1.

TABLE 1

| The number of entire RBs in downlink | PRBG size (N) |
| --- | --- |
| ≤10 | 1 |
| 11-26 | 2 |
| 27-63 | 3 |
| 64-110 | 4 |

Among the three above-mentioned resource allocation methods, in a case of Type-0 RA, a resource is allocated to have the same transmission parameter in a PRBG unit. Further, in a case of Type-1 RA, a resource is allocated to have the same transmission parameter in a PRB pair unit. Further, in a case of Type-2 RA, when the localized resource allocation scheme is used, a resource is allocated to have the same transmission parameter in a PRB pair unit, and when the distributed resource allocation scheme is used, a resource is allocated to have the same transmission parameter in a PRB unit. Here, a detailed content, which relates to Type-0 RA, Type-1 RA, Type2 RA, the localized resource allocation scheme, and the distributed resource allocation scheme, can be identified by referencing [3GPP TS 36.213, 7.6.1 to 7.6.1.3].

When the RA granularity for the possible RA methods defined in the LTE/LTE-A system is applied to the blind detection of an interference parameter, a basic unit of the interference PDSCH scheduling to which the blind detection can be applied when a UE has no information on a RA method of an interference cell should be a PRB. That is, when the UE has no information on a RA method of an interference cell, a minimum unit which can change a transmission parameter of an interference cell may be assumed to be a PRB which is a minimum PDSCH scheduling unit. In this case, even when the PDSCH of the UE is scheduled through various PRB pairs, the UE has no choice but to assume that the transmission parameter of an interference cell may be changed to be a PRB unit. Thus, in the corresponding situation, the blind detection should be performed in each PRB unit. When the blind detection is performed in a PRB unit, the UE should perform two times as many blind detections as compared with a case where the blind detection is performed in a PRB pair unit and the number of REs which can be used in each blind detection is reduced, so that the probability of success of the blind detection is reduced.

Hereinbelow, a method and an apparatus, which can increase a success probability to identify a transmission parameter for a given number of blind detections (e.g. a one-time blind detection) is disclosed. Accordingly the number of necessary blind detections performed by a UE can be reduced for a demanded success probability. Further, an operation of allocating a resource by the eNB is limited or information on resource allocation of the corresponding interference cell is notified to the UE so that the UE can perform the blind detection while having a larger RA granularity. In this case, since restraint and information on the corresponding interference RA granularity may act as scheduling restraint for the entire network, system information and restraint should be designed to increase the complexity and the probability of success of the blind detection by only limited scheduling restraint.

First Embodiment

In a first embodiment of the present invention, a method of providing blind detection to a UE at least in a PRB-pair unit only with small scheduling constraints in the LTE/LTE-A system will be described. For example, in a network situation in which there is a Network Assisted Interference Cancellation and Suppression (NAICS) UE, which calculates an optimum LLR by considering interference cancellation or a modulation scheme of interference (statistical characteristic of an interference signal), it can be assumed that the NAICS UE does not use the distributed version of resource allocation type-2 in an interference cell. Otherwise, in a network situation in which there is an NAICS UE, an eNB network can be configured such that it is ensured that the NAICS UE always applies the blind detection at least in a PRB-pair unit. That is, when receiving, from an eNB, identification that an NAICS operation can be performed, a UE, which supports NAICS, always applies the blind detection at least in a PRB-pair unit. Here, a method of receiving, by the UE, an identification that the NAICS operation can be performed corresponds to that the eNB downloads, to the UE, a higher signaling which notifies that the eNB itself can directly perform the NAICS operation, according to an embodiment. Alternatively, according to an embodiment, when identifying a signal that notifies a transmission parameter of an interference cell, such as "information on an energy ratio per an RE of the data RE and the CRS RE" or "information on a transmission mode", the UE may determine that the NAICS operation can be performed. Thereafter, the UE always applies the blind detection at least in a PRB-pair unit. A method of configuring a network such that the NAICS UE always applies the blind detection at least in a PRB-pair unit in the network makes a configuration such that an eNB, which is configured as an interference cell with respect to a specific NAICS UE, always performs PDSCH resource allocation in a PRB-pair unit. Alternatively, according to an embodiment, it can be configured such that the eNB, which is configured as an interference cell with respect to a specific NAICS UE, does not use the distributed version of resource allocation type-2. Otherwise, according to an embodiment, in regard to a resource to which an NAICS UE is allocated through cooperation between eNBs, only UEs having the same transmission parameter(s) in a corresponding interference cell may be allocated to the corresponding resource.

Second Embodiment

In a second embodiment of the present invention, an eNB can notify, to a UE, information on whether an NAICS UE can perform the blind detection at least in a PRB-pair unit in the LTE/LTE-A system or not, i.e. at least a PRB-pair unit is necessary for successfully performing blind detection. At this time, the eNB can transmit, to the UE, the information on whether the NAICS UE can perform the blind detection at least in a PRB-pair unit or not, through a higher signal (e.g. at least one bit in the header of each PRB, PRB-pair unit, or PRBG unit). Further, the UE can identify the corresponding higher signal, thereby identifying whether the blind detection can be performed at least in a PRB-pair unit. That is, the eNB can notify, to the UE, information on "whether type-2 distribution resource allocation is used or not" or "whether a resource is allocated at least in a PRB-pair unit in an interference cell", through a higher signal. For example, the eNB can download, to the UE, a higher signal including information indicating that "distributed version of type-2 resource allocation is not used". Alternatively, the eNB can download, to the UE, a higher signal including information indicating that "a resource is allocated at least in a PRB-pair unit in an interference cell". Thereafter, the UE can perform the blind detection in a PRB-pair unit by assuming resource allocation of the corresponding interference. In this case, according to an embodiment, the eNB can receive resource allocation information of an interference cell from the interference cell, and then transmit the corresponding higher signal to the UE. When identifying the higher signal including the information on "whether the type-2 distribution resource allocation is used or not" or "whether a resource is allocated at least in a PRB-pair unit in an interference cell", thereby identifying that the blind detection can be performed at least in a PRB-pair unit, the UE can apply the blind detection at least in a PRB-pair unit to calculate an optimum LLR in consideration of interference cancellation and the modulation scheme of interference and then perform the decoding. That is, when receiving the higher signal including the information indicating that "distributed version of type-2 resource allocation is not used" or "a resource is allocated at least in a PRB-pair unit in an interference cell", the UE can apply the blind detection at least in a PRB-pair unit to calculate an optimum LLR in consideration of interference cancellation and the modulation scheme of interference and then perform the decoding. In contrast, when identifying the higher signal including the information on "whether the type-2 distribution resource allocation is used or not" or "whether a resource is allocated at least in a PRB-pair unit in an interference cell", thereby identifying that the blind detection cannot be performed at least in a PRB-pair unit, the UE can perform the blind detection in a PRB unit, calculate an optimum LLR in consideration of interference cancellation and the modulation scheme of interference, and then perform the decoding. Alternatively, according to an embodiment, when identifying the corresponding higher signal, thereby identifying that the blind detection cannot be performed at least in a PRB-pair unit, the UE can perform the decoding in the existing scheme without considering separate interference cancellation and a separate modulation scheme of interference for a signal from an interference cell. Further, according to an embodiment, even when identifying that there is no higher signal including information on "whether type-2 distribution resource allocation is used or not" or "whether a resource is allocated at least in a PRB-pair unit in an interference cell", the UE can recognize that the blind detection cannot be performed at least in a PRB-pair unit.

Third Embodiment

In addition to the first embodiment or the second embodiment, in a third embodiment of the present invention, an eNB notifies, to a UE, information on whether the blind detection can be performed in a PRBG unit, and the UE determines whether the blind detection is applied in a PRBG unit, using the corresponding information, thereby performing an NAICS operation. At this time, the eNB can transmit the information on whether the blind detection can be performed in a PRBG unit, to the UE through a higher signal. That is, the eNB can notify, to the UE, information on "whether only type-0 RA scheme is used or not" or "whether a resource is allocated in a PRBG unit in an interference cell", through a higher signal. For example, the eNB can download, to the UE, a higher signal including information indicating that "only type-0 RA scheme is used". Alternatively, the eNB can download, to the UE, a higher signal including information indicating that "a resource is allocated in a PRBG unit in an interference cell". Thereafter, the UE can perform the blind detection in a PRBG unit by assuming resource allocation of the corresponding interference. In this case, according to an embodiment, the eNB can receive resource allocation information of an interference cell from the interference cell, and then transmit the corresponding higher signal to the UE. When identifying the higher signal including the information on "whether only the type-0 RA scheme is used or not" or "whether a resource is allocated in a PRBG unit in an interference cell or not", thereby identifying that the blind detection can be performed at least in a PRBG unit, the UE can apply the blind detection in a PRBG unit to calculate an optimum LLR in consideration of interference cancellation and the modulation scheme of interference and then perform the decoding. That is, when receiving the higher signal including the information indicating that "only type-0 RA scheme is used" or "a resource is allocated in a PRBG unit in an interference cell", the UE can apply the blind detection in a PRBG unit to calculate an optimum LLR in consideration of interference cancellation and the modulation scheme of interference and then perform the decoding. In contrast, when identifying the higher signal including the information on "whether only type-0 RA scheme is used or not" or "whether a resource is allocated in a PRBG in an interference cell", thereby identifying that the blind detection cannot be performed in a PRBG unit, the UE can perform the blind detection in a PRB unit or in a PRB-pair unit, calculate an optimum LLR in consideration of interference cancellation and the modulation scheme of interference for each of the PRB unit or the PRB-pair unit, and then perform the decoding. Alternatively, according to an embodiment, when identify the corresponding higher signal, thereby identifying that the blind detection cannot be performed at least in a PRBG unit, the UE can perform the decoding in the existing scheme without considering separate interference cancellation and a separate modulation scheme of interference for a signal from an interference cell. Further, according to an embodiment, even when identifying that there is no higher signal including information on "whether only a type-0 RA scheme is used or not" or "whether a resource is allocated in a PRBG unit in an interference cell", the UE can recognize that the blind detection cannot be performed at least in a PRBG unit.

Fourth Embodiment

In a fourth embodiment of the present invention, an eNB can directly notify, to a UE, information on which resource unit(s) is used for the blind detection. Further, the UE can apply the blind detection in the notified unit using the corresponding information, thereby performing an NAICS operation. That is, the eNB can download, to the UE, a higher signal including information indicating that "a resource is allocated in an M PRB-pair unit in an interference cell". Thereafter, the UE can perform the blind detection by assuming resource allocation of the corresponding interference. Here, according to an embodiment, the M value may be separately notified to the UE, or has been previously determined to be a function of the number of downlink RBs as in Table 1. In this case, according to an embodiment, the eNB can receive resource allocation information of an interference cell from the interference cell, and then transmit the corresponding higher signal to the UE. When identifying a higher signal including information indicating that "a resource is allocated in an M PRB-pair unit in an interference cell", thereby identifying that the blind detection can be performed at least in an M PRB-pair unit, the UE applies the blind detection in the corresponding unit to calculate an optimum LLR in consideration of interference cancellation and a modulation scheme of interference, and then performs decoding. Here, in regard to a UE operation added when the value M is separately notified to the UE, when the value M is larger than or equal to 1, the UE performs the blind detection in an M PRB-pair unit to calculate an optimum LLR in consideration of interference cancellation and a modulation scheme of interference in an M PRB-pair unit, and then performs decoding. In contrast, when the M value is equal to 0, the UE can perform the blind detection in a PRB unit to calculate an optimum LLR in consideration of interference cancellation and a modulation scheme of interference in a PRB unit, and then performs decoding. Alternatively, according to an embodiment, when M is equal to 0, the UE can perform the decoding in the existing scheme without considering separate interference cancellation and a separate modulation scheme of interference with respect to a signal from an interference cell. Further, according to an embodiment, even when identifying that there is no higher signal including information indicating that "a resource is allocated in an M PRB-pair unit in an interference cell", the UE can perform the blind detection in a PRB unit or can perform the decoding in the existing scheme without considering separate interference cancellation and a separate modulation scheme of interference with respect to a signal from an interference cell.

Meanwhile, the fourth embodiment has an advantageous point in that a network can configure an interference PDSCH allocation resource unit enough to support an NAILS UE by itself, thereby increasing a degree of freedom of implementation.

Figure 10:
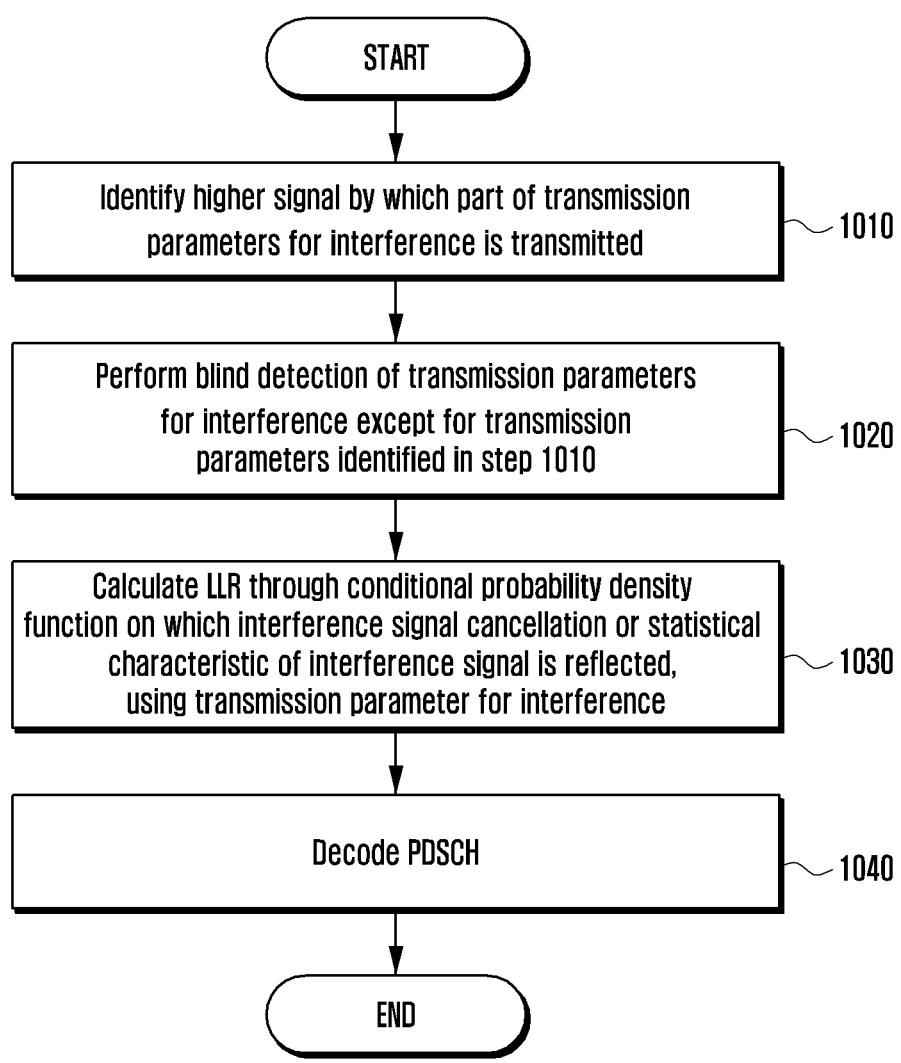
FIG. 10 is a flowchart illustrating an operation of a UE according to an embodiment of the present invention.

FIG. 10 is a flowchart illustrating a method of a UE according to an embodiment of the present invention.

Referring to FIG. 10, an example of a UE method for a (NAICS) PDSCH reception method through interference cancellation and suppression of the UE according to the above-described embodiments of the present invention is illustrated. Referring to FIG. 10, in method step 1010, the UE can receive a higher signal (e.g. implemented in the radio resource control protocol) which transfers a part of the transmission parameters for interference. Further, the UE can start an interference cancellation and suppression process by identifying the transmission parameters included in the received higher signal. According to an embodiment, herein, the higher signal for the transmission parameters may include information on a resource allocation unit of the above-described interference PDSCH.

Thereafter, in method step 1020, the UE can perform the blind detection of an RI/PMI in a set of possible transmission ranks and possible precoding matrices, using the transmission parameters received/identified in method step 1010, and additionally perform the blind detection for a modulation scheme. According to an embodiment, the blind detection of the modulation scheme/PI/PMI can be performed jointly or sequentially. That is, as a result of method step 1020, transmission parameters for interference (at least) including modulation scheme/RI/PMI are determined. Further, a resource unit in which the blind detection is applied may be determined using the above-described resource allocation unit information of the interference PDSCH.

Further, in method step 1030, the UE calculates an LLR through a conditional probability density function using prior interference signal cancellation or using a statistic characteristic (reflecting the modulation scheme) of the actual interference signal for calculating the conditional probability density function, wherein interference signal cancellation/reflecting statistic characteristics are performed by using the determined transmission parameters for interference (which includes a result obtained by performing the blind detection for the modulation scheme/RI/PMI). According to an embodiment, an interference signal to be cancelled from a reception signal in advance is the interference signal with the greatest signal amplitude among the interference signals at the UE. Further such interference signal (i.e. the interference signal with the greatest signal amplitude, then the interference signal with the second greatest signal amplitude and so on) may be cancelled in advance as long as such cancellation results in SNIR improvement, i.e. cancellation results in SNIR improvement which is higher than a predetermined threshold value (per cancellation).

Further, in method step 1040, the UE can perform PDSCH decoding using the accurately calculated LLR.

Figure 11:
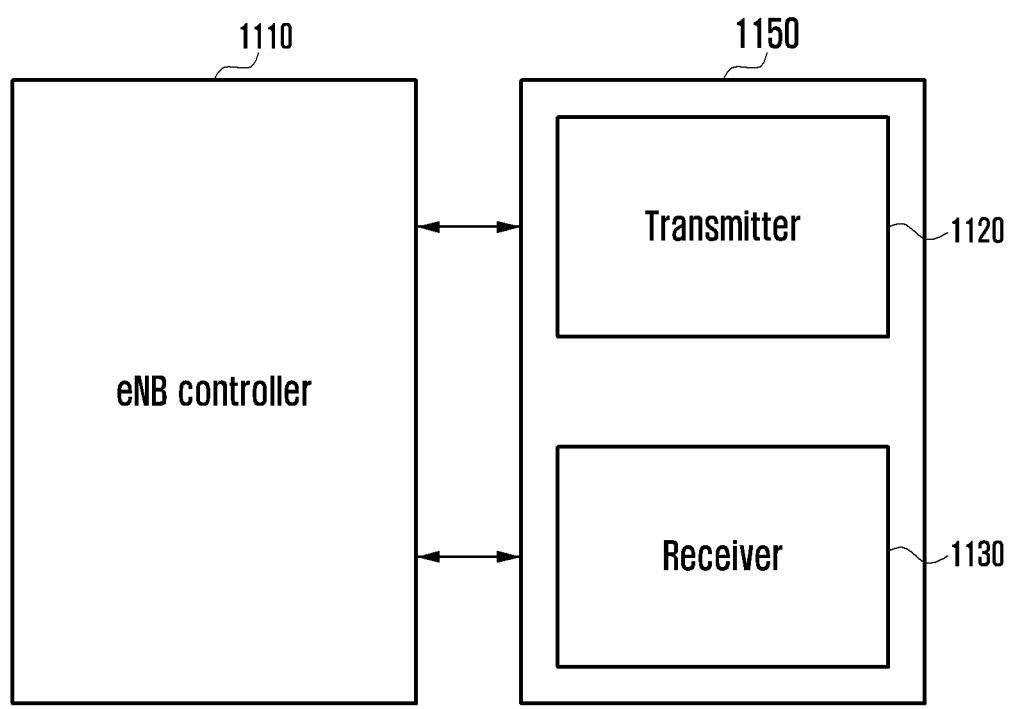
FIG. 11 is a block diagram illustrating an eNB according to an embodiment of the present invention.

FIG. 11 is a block diagram illustrating an eNB according to an embodiment of the present invention.

Referring to FIG. 11, an eNB according to an embodiment of the present invention may include a communication unit 1150; the communication unit 1150 comprising a transmitter 1120 and a receiver 1130, and an eNB controller 1110 adapted for controlling an overall operation of the eNB.

The eNB controller 1110 of the eNB is adapted to control the eNB to perform (at least) one operation of the above-described embodiments. For example, the eNB control 1110 is adapted to configure an interference cell for a specific UE, configure a transmission parameter of an interference cell to be transmitted to a UE, and determine PDSCH scheduling, resource allocation information of the corresponding PDSCH, etc. Here, the transmission parameter of an interference cell may include information on a minimum unit (such as PRB, PRB-pair, PRBG) of resource allocation in which the blind detection can be applied.

Further, the communication unit 1150 of the eNB is adapted to transmit and/or receive a signal according to (at least) one operation of the above-described embodiments. At this time, the communication unit 1150 may include a transmitter 1120 and a receiver 1130 as illustrated in FIG. 11. For example, the eNB controller 1110 of the eNB is adapted to notify the determined transmission parameters of an interference cell of the UE to the UE using the transmitter 1120. Further, the transmitter 1120 can be adapted to transmit control information and a PDSCH to the UE according to the determined PDSCH scheduling of the eNB. Further, the eNB can be adapted to receive channel state information for PDSCH transmission and PDSCH scheduling of the UE, etc. using the receiver 1130.

Figure 12:
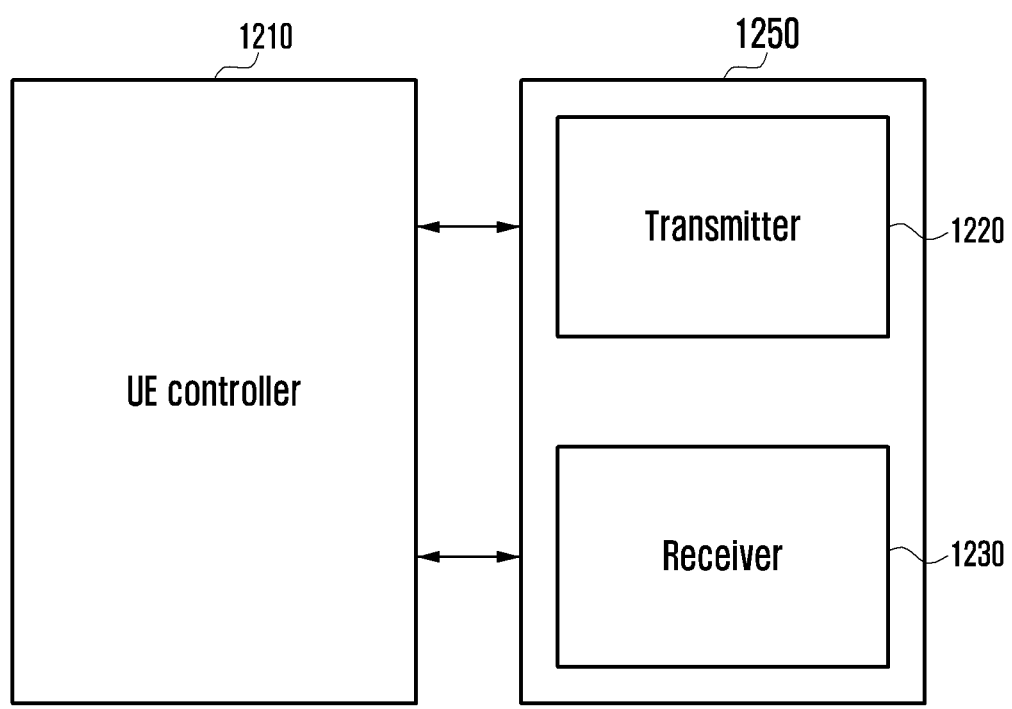
FIG. 12 is a block diagram illustrating a UE according to an embodiment of the present invention.

FIG. 12 is a block diagram illustrating a UE according to an embodiment of the present invention.

Referring to FIG. 12, a UE according to an embodiment of the present invention may include a communication unit 1250; the communication unit 1250 comprising a transmitter 1220 and a receiver 1230, and a UE controller 1210 for controlling an overall operation of the UE.

The UE controller 1210 of the UE is adapted to control the UE to perform one operation of the above-described embodiments. For example, the UE controller 1210 of the UE can be adapted to receive control information for transmission parameter configuration of an interference cell from the eNB using the receiver 1230. Further, the UE controller 1210 can be adapted to determine which wireless resource is used to measure an interference channel and perform the blind detection. Further, the UE controller 1210 can be adapted to determine information on a minimum requirement of a resource allocation unit (PRB, PRB-pair, PRBG) for applying the blind detection, and to perform the blind detection, and then to perform the decoding through interference cancellation and suppression.

Further, the communication unit 1250 of the eNB is adapted to transmit and/or receive a signal according to (at least) one operation of the above-described embodiments. At this time, the communication unit 1250 may include a transmitter 1220 and a receiver 1230 as illustrated in FIG. 12. For example, the UE controller 1210 may be adapted to determine scheduling information of a PDSCH on the basis of the control information.

Meanwhile, exemplary embodiments of the present invention shown and described in this specification and the drawings correspond to specific examples presented in order to easily explain technical contents of the present invention, and to help comprehension of the present invention, but are not intended to limit the scope of the present invention. That is, it is obvious to those skilled in the art to which the present invention belongs that different modifications can be achieved based on the technical contents of the present invention.

Therefore, the detailed descriptions should not be construed to be limited in all aspects, but should be considered to be an example. The scope of the present invention should be determined by rational interpretation of the appended claims, and all modifications within a range equivalent to the present invention should be construed as being included in the scope of the present invention.

What is claimed is:

1. A method performed by a terminal in a wireless communication system, the method, comprising:
   receiving, from a base station, information indicating resource allocation granularity for a neighbor cell associated with an interference signal;
   identifying resource allocation granularity N in a physical resource block (PRB) pair based on the information;
   identifying PRB pairs to be applied a same precoding, based on the identified resource allocation granularity N; and
   performing an interference cancellation for the interference signal based on the identified PRB pairs,
   wherein the identified PRB pairs are N consecutive PRB pairs.

2. The method of claim 1, wherein the information is provided by a higher layer parameter N, and
   wherein N is one of 1, 2, 3 and 4.

3. The method of claim 1, further comprising:
   identifying that the terminal supports network assisted interference cancellation.

4. The method of claim 1, wherein performing interference cancellation further comprises:
   performing blind detection for the interference signal based on the identified resource allocation granularity N;
   performing error-correcting coding based on a result of the blind detection; and
   decoding data based on the error-correcting coding.

5. A method performed by a base station in a wireless communication system, the method comprising:
   generating information indicating resource allocation granularity for a neighbor cell associated with an interference signal; and
   transmitting, to a terminal, the information via a higher layer signaling,
   wherein resource allocation granularity N is identified in a physical resource block (PRB) pair based on the information,
   wherein PRB pairs to be applied a same precoding are identified based on the resource allocation granularity N, and
   wherein an interference cancellation for the interference signal is performed based on the identified PRB pairs,
   wherein the identified PRB pairs are N consecutive PRB pairs.

6. The method of claim 5, wherein the N is one of 1, 2, 3 and 4.

7. The method of claim 5, wherein the information is transmitted, in case that the terminal supports network assisted interference cancellation.

8. The method of claim 5, wherein the interference cancellation is performed by a blind detection for the interference signal based on the identified resource allocation granularity N, an error-correcting coding based on a result of the blind detection, and decoding of data based on the error-correcting coding.

9. A terminal in a wireless communication system, comprising:
a transceiver; and
a controller further configured to:
control the transceiver to receive, from a base station, information indicating resource allocation granularity for a neighbor cell associated with an interference signal;
identify resource allocation granularity N in a physical resource block (PRB) pair based on the information;
identify PRB pairs to be applied a same precoding, based on the identified resource allocation granularity N; and
perform an interference cancellation for the interference signal based on the identified PRB pairs, wherein the identified PRB pairs are N consecutive PRB pairs.

10. The terminal of claim 9, wherein the information is provided by a higher layer parameter N, and wherein N is one of 1, 2, 3 and 4.

11. The terminal of claim 9, wherein the controller is further configured to identify that the terminal supports network assisted interference cancellation.

12. The terminal of claim 9, wherein the controller is further configured to perform interference cancellation by performing blind detection for the interference signal based on the identified resource allocation granularity N; performing error-correcting coding based on a result of the blind detection; and decoding data based on the error-correcting coding.

13. A base station in a wireless communication system, comprising:
a transceiver; and
a controller further configured to:
generate information indicating resource allocation granularity for a neighbor cell associated with an interference signal; and
control the transceiver to transmit, to a terminal, the information via a higher layer signaling, wherein resource allocation granularity N is identified in a physical resource block (PRB) pair based on the information, wherein PRB pairs to be applied a same precoding are identified based on the resource allocation granularity N, and wherein an interference cancellation for the interference signal is performed based on the identified PRB pairs, wherein the identified PRB pairs are N consecutive PRB pairs.

14. The base station of claim 13, wherein N is one of 1, 2, 3 and 4.

15. The base station of claim 13, wherein the controller is further configured to control the transceiver to transmit the information, in case that the terminal supports network assisted interference cancellation.

16. The base station of claim 13, wherein the interference cancellation is performed by a blind detection for the interference signal based on the identified resource allocation granularity N, an error-correcting coding based on a result of the blind detection, and decoding of data based on the error-correcting coding.

* * * * *